United States Patent [19]

Davis

[11] 4,180,936
[45] Jan. 1, 1980

[54] FISHING LURE

[76] Inventor: Lester M. Davis, 10805 36 NW., Gig Harbor, Wash. 98335

[21] Appl. No.: 889,227

[22] Filed: Mar. 23, 1978

[51] Int. Cl.$^2$ ............................................. A01K 85/04
[52] U.S. Cl. ..................................................... 43/42.5
[58] Field of Search .................. 43/42.5, 42.51, 42.52, 43/42.33, 42.34

[56] References Cited

U.S. PATENT DOCUMENTS

| | | | |
|---|---|---|---|
| 861,116 | 7/1907 | Heddon | 43/42.52 X |
| 1,762,386 | 6/1930 | Collingbourne | 43/42.52 |
| 2,588,300 | 3/1952 | Smith | 43/42.5 X |
| 2,711,048 | 6/1955 | Edson | 43/42.34 X |
| 3,043,042 | 7/1962 | Mutti | 43/42.51 |
| 3,656,253 | 4/1972 | Gaunt | 43/42.33 |
| 3,919,802 | 11/1975 | Davis | 43/42.34 X |

Primary Examiner—Nicholas P. Godici

[57] ABSTRACT

This fishing lure comprises two elliptical plates which intersect to form a cross, in section, and with the plates set at right angles to each other. The lure may be case in one piece but it is preferably formed of two identical pieces, each of which comprises a flat plate, of elliptical shape in plan, and which is provided with a slot extending along its major axis and from an end portion to the mid portion thereof. Also, a groove extends along each side or face of the plate, along said major axis, and from the end of the slot to the other end of the plate. Each of the slots in a plate is of a width to slidingly and tightly receive the edge portion of the groove in the other plate. If two plates are involved, they may be brazed together after assembly, if desired. Also, the lures may be made of brass, plated, and be decorated with a layer of diffraction material secured to the plated surfaces.

1 Claim, 7 Drawing Figures

U.S. Patent  Jan. 1, 1980  4,180,936
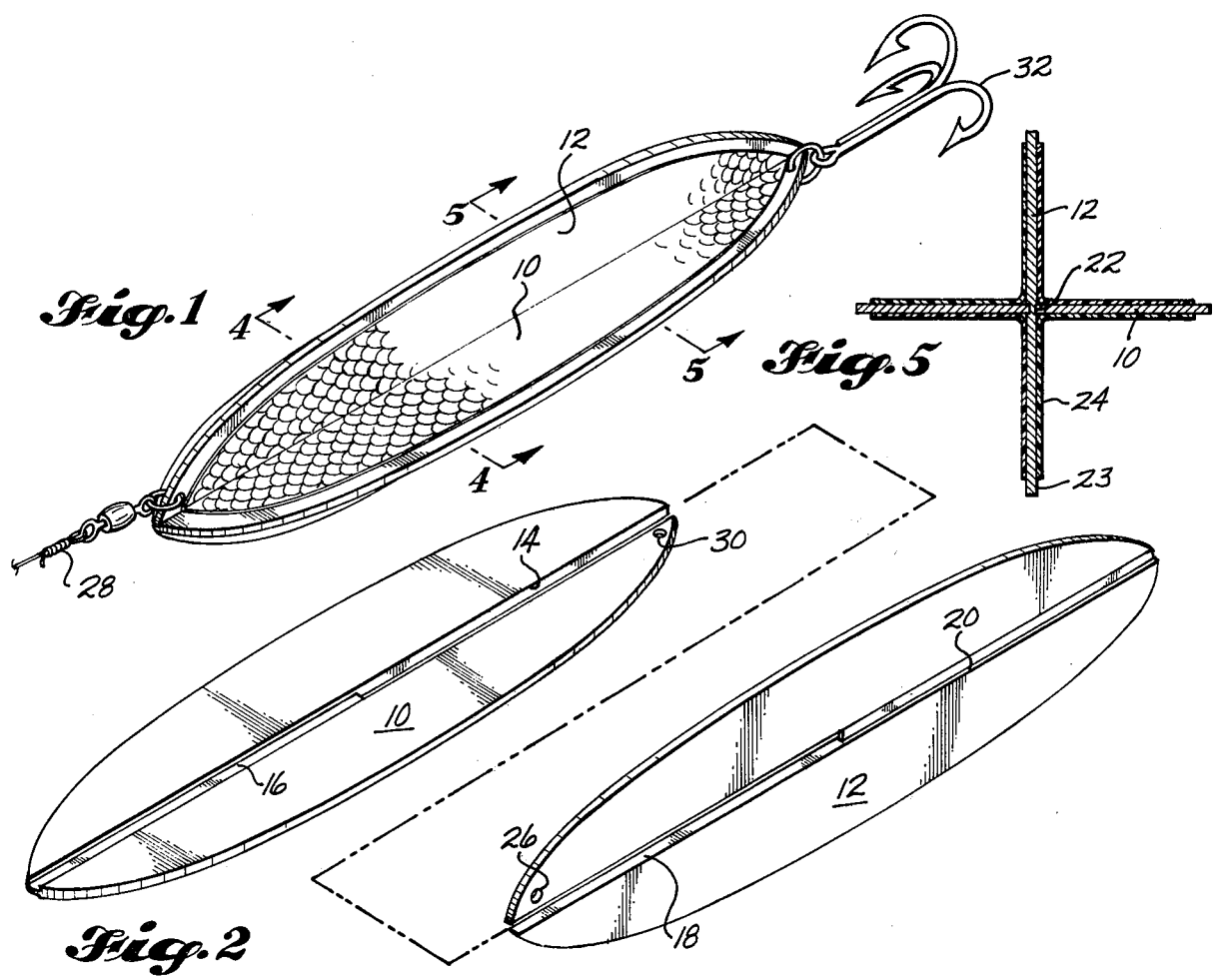
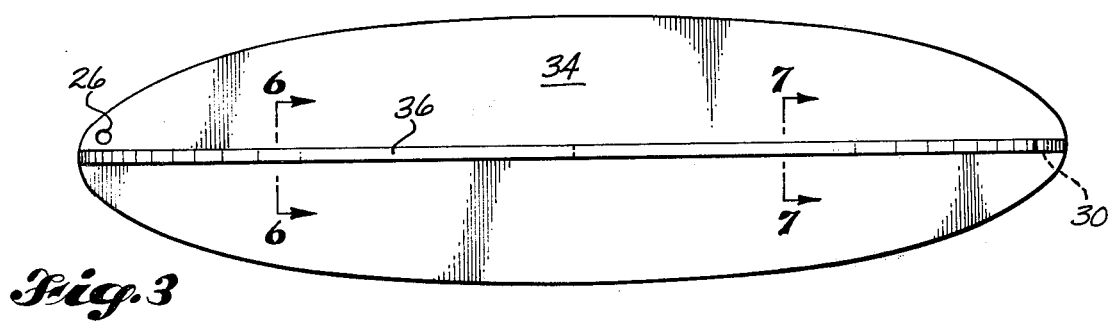
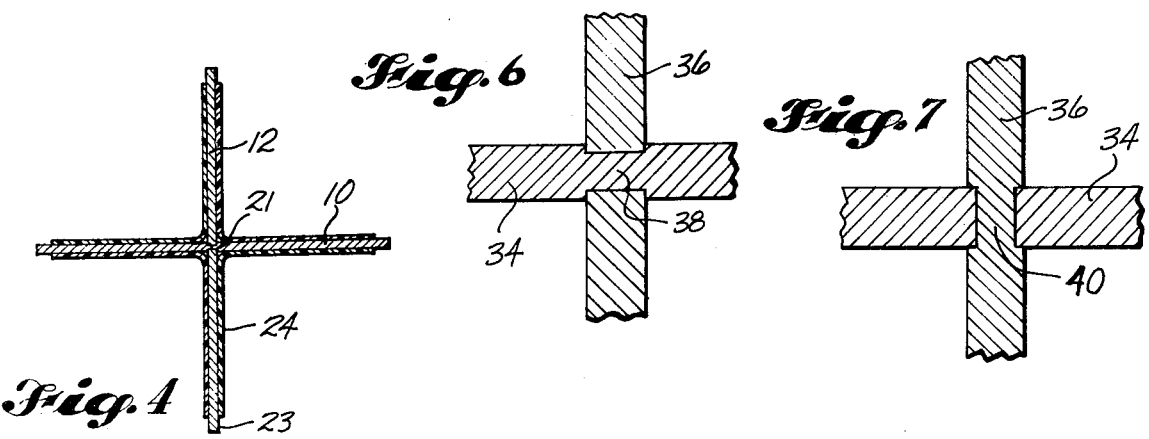

FISHING LURE

BACKGROUND OF THE INVENTION

This invention relates to a fishing lure which may be used under a multitude of fishing conditions. It may be trolled, or it may be jigged, or cast. It is a relatively heavy and very sturdy lure and may be cast against rocky shores or beaches and then drawn back to the caster in attracting fish to the lure and fishhook connected with the lure. Also, the lure may be cast and allowed to "Jig" downwardly or it may be trolled.

SUMMARY OF THE INVENTION

This invention relates to a fishing lure comprising two intersecting plates, each of which is elliptical in plan. The two plates intersect and with the plates at right angles to each other and, in the completed lure, the forward end and rearward end portions of the two plates are, respectively, aligned. Also, the lure may be constructed of two identical plates, each of which is elliptical in plan and with a slot extending along its major axis and from one end to a mid portion thereof. Also, on each plate and on both surfaces thereof, grooves extend which grooves are aligned with such slots and extend along the major axis. The width of each slot is the thickness of the plate between the bottom of two aligned grooves. Thus, the grooves on each side of a plate function to brace and support the material of the plate adjacent the slot in the other plate. Also, the fishing line is attached means carried by one plate and the fishing hook is attached to means carried by the other plate and with the opposing pressures between the line and the fishing hook urging the plates into assembled position. Preferably the lure is made of brass and the surfaces are plated and then the surfaces are decorated by an overlay of diffraction grating foil.

The above-mentioned objects, advantages, and characteristics of my invention will become implicit and explicit as the description of my invention proceeds in connection with the accompanying drawings which illustrate and clarify preferred forms of my invention and throughout which like reference numerals refer to like parts.

IN THE DRAWINGS

FIG. 1 is a perspective view of a fishing lure embodying my invention and with a fragment of a fishing line attached to the forward end of the lure and a fishhook attached to the other end;

FIG. 2 is a perspective, exploded view of the lure shown in FIG. 1;

FIG. 3 is a perspective view of a modified form of fishing lure embodying my invention;

FIG. 4 is a sectional view, taken substantially on broken line 4—4 of FIG. 1;

FIG. 5 is a view similar to FIG. 4 and taken substantially on broken line 5—5 of FIG. 1;

FIG. 6 is a fragmentary sectional view, on a larger scale, and taken substantially on broken line 6—6 of FIG. 3; and FIG. 7 is a sectional view similar to FIG. 6 and taken substantially on broken line 7—7 of FIG. 3.

DESCRIPTION OF THE INVENTION

The lure of FIGS. 1, 2, and 4 comprises two plates 10 and 12 and each is substantially elliptical in plan. The plate 10 has a slot 14 extending along its major axis and from its rear end portion to its mid or central portion (rear end, mid portion, and forward end portion of plates 10 and 12 refer to the relative positions of the plates as they travel through the water when in use) and a groove 16 extending along both surfaces of plate 10, along its major axis, and from its mid portion to its forward end portion. The plate 12 has a slot 18 extending along its major axis and from its forward end portion to its mid portion and a groove 20 extends along the major axis of plate 12 and from its mid portion to its trailing end portion. Each of the grooves 16 and 20 is of substantial U-shape, with the legs and bottom of the U forming right angles, and of a width only slightly larger than the width of a slot 14 or 18. A groove 16 or 20 is formed in both the bottom and top faces of a plate 10 or 12 and with the grooves in each plate aligned. The width of a slot 18 in a plate 12 is only slightly larger than the thickness 21 (see FIG. 4) of the material of a plate 10 which is the distance between the bottoms of two aligned grooves 16 in a plate 10. Also, the width of the slot 14 in the plate 10 is only slightly larger than the thickness 22 (see FIG. 5) of the material of the plate 12 which is the distance between the bottoms of two aligned grooves 20 in a plate 12. These dimensions provide for an extremely snug sliding dry fit after the slot 14 of plate 10 is slid into the slot 18 of plate 12 and the sliding continues until the slot 14 of plate 10 continues and slides in the grooves 20 of plate 12 and the slot 18 of plate 12 slides in the grooves 16 of plate 10. This continues until the forward end of plate 12 (with the slot 18 therein) is aligned with the forward end of plate 10 (having grooves 16 therein) and the rear end of plate 10 (with slots 14 therein) is aligned with the rear end of plate 12 (having grooves 20 therein).

The plates 10 and 12 are identical in structure, which aids in their manufacture, but they are turned relative to each other to assume the positions shown in FIGS. 1, 2, 4, and 5 of the drawings. Also, such plates 10 and 12 can be readily manufactured by a stamping process from a suitable material, as brass sheets. Thereafter, they are preferably plated as by gold, silver, or chromium. Thereafter, preferably, a strip or layer or diffraction grating foil is adhered to partially cover the plated surfaces—thus, plated surface 23 is partially covered by diffraction material layer 24 with a portion of the surface 23 exposed (see FIGS. 1, 4, and 5).

After plates 10 and 12, shown separated or exploded in FIG. 2, have been moved to assume the positions of FIG. 1, the hole 26 in plate 12 is connected with a fishing line 28 and the hole 30 in plate 10 is connected with a fishing hook, as treble hook 32. The hole 26 is preferably on the upper side of plate 12 (when the same is in the position shown in FIGS. 1 and 2) and the hole 30 is preferably on the lower side of plate 10 (when the lure is in the same position) as this provides for a tendency of the lure of FIG. 1 to dive and move angularly downwardly as it is towed by a fishing line 28. Also, as the forward thrust on the fishing line 28 urges the plate 12 forward and any strain on the hook 22 or potential fish carried thereby provides for a reverse thrust, the two plates 10 and 12 are urged into relatively retained positions during usage while fishing. Thus, a relatively tight sliding fit between the two plates 10 and 12 is all that is necessary to maintain the assembled position shown in FIG. 1 of the drawings.

The lure of FIGS. 3, 6, and 7 represents a modified form of my invention. Here the additional and more deluxe features of plating and providing a layer of diffraction grating foil are not provided. The two plates 34 and 36 are provided with the counterparts of plates 10 and 12, respectively, and have the same arrangement of slots and grooves corresponding to the slot 14 and grooves 16 of plate 10 and slot 18 and grooves 20 of plate 12. Also, the same holes 26 and 30 are provided for the same purposes. Plate 34 has the same grooves in both faces as grooves 16 in plate 10 to provide the thickness (FIG. 6) of material 38 (corresponding to the thickness 21 of plate 10). Thus, the slot in the forward half portion of plate 36 disposed along its major axis snugly and slidingly fits against the thickness of the material 38 between the grooves in both faces of the plate 34 and disposed along the major axis and in the forward half portion of plate 36. Similarly, the plate 36 has the same grooves in both faces as grooves 20 in plate 12 to provide (FIG. 7) the thickness 40 (corresponding to the thickness 22 in plate 12) between the bottoms of aligned grooves 20 in plate 12. Thus, a slot in the rear half portion of plate 34 disposed along its major axis snugly and slidingly fits against the thickness of material 40 and in the grooves in both faces of plate 36 and disposed along its major axis and in the front half portion of plate 36.

After each plate 34 and 36 has been provided by stamping, the surfaces and edge portions can be readily buffed and polished. Thereafter, the two plates can be readily assembled as explained in detail regarding the counterparts shown and described in connection with FIGS. 1, 2, 4, and 5.

Also, if it is desired to prevent the lure from being disassembled after it has been assembled to the construction of FIGS. 1 or 3, the plates 10 and 12 of FIGS. 1, 2, 4, and 5, or the plates 34 and 36 of FIGS. 3, 6, and 7 may have such plates joined by brazing the plates together, such as at the area of the open end portions of the slots 14 and 18 to the adjacent parts of the grooves 20 and 16.

During operation of the lure comprising plates 10 and 12 or 34 and 36, it will be apparent that when the lure is trolled, it will tend to dive as the hole 26, connected with the fishing line 28, is disposed above the intersection substantially between the elliptical plates which are disposed at 90° to each other. Also, as the lure is cast or thrown, it has body and weight and thus suitable for casting and fishing with it after being cast. Once it is cast, due to its configuration and line attachment, it can be allowed to "jig" downwardly in a zig-zag pattern until stopped by strain on the fishing line.

The invention has been, thus far, described as constituting two identical plates provided with slots and grooves. However, a similar construction can be provided by casting the assembled construction in one piece. This will have some of, but not all of, the advantages of the construction previously described and illustrated.

SUMMARY OF THE INVENTION

It will now be obvious that I have provided a fishing lure comprising two intersecting plates 10 and 12 or 34 and 36 of elliptical shape forming a cross in section and with the plates disposed substantially at right angles to each other. When the lure is assembled or is cast in one piece, the forward end portions of the plates 10 and 12 or 34 and 36 and the rearward end portions of the plates 10 and 12 or 34 and 36 are aligned. When the two intersecting plates 10 and 12 or 34 and 36 are employed, each of such plates has a slot, such as the slot 14 of plate 10 or 18 or plate 12 extending along its major axis and from an end portion to a mid portion thereof. Also, each of the two plates, such as 10 and 12 or 34 and 36, has one of such plates, as 12, provided with means, such as the hole 26, for engagement with a fishing line, as 28, and the other plate, as 10, is provided with means, as the hole 30, for engagement with a fishing hook, as treble hook 32. Also, two plates, as 10 and 12, have grooves 16 or 20 in each face thereof and the slot in one plate, as the slot 14 in plate 10, or the slot 18 in plate 12, will slidingly and snugly interfit with the grooves 20 in plate 12 and the grooves 16 in plate 10. Also, if desired, the slot 18 in a plate 12 may be permanently secured to another plate 10 at the forward end of the lure by brazing or by the use of appropriate adhesives and the slot 14 of the plate 10 at the rear end of the lure by such means. If desired, the surface of the lure may be embellished by such decorations as gold, silver, or chromium surface plate 23 and a diffraction grating or other decorative or reflecting layer 24 may be added.

Obviously, changes may be made in the forms, arrangements and parts of my invention without departing from the principle thereof, the above setting forth only preferred forms of embodiment of my invention.

I claim:

1. A fishing lure comprising two slidingly interfitted and intersecting plates of elliptical shape in plan, forming a cross in section and with the plates disposed at substantially right angles to each other and with the forward end portions and the rearward end portions, respectively, aligned, said plates comprising separate plates, one thereof having a slot extending from its forward end portion and along its major axis and to a mid portion thereof and having means, disposed in its forward end portion, for engagement with a fishing line, and the other thereof having a slot extending from its rearward end portion and along its major axis and to a mid portion thereof and having means, disposed in its rearward end portion, for engagement with a fishhook, whereby a pull exerted between the fishing line and the fishhook, during fishing, urges the two plates into engagement with each other and a pull in the opposite direction tends to release the plates from each other, said plates being further characterized by each thereof being provided with parallel grooves in a face thereof, the grooves are aligned with the slots in the plates, and the slot in one plate slidingly and snugly interfits with the walls of the aligned grooves in the other plate.

* * * * *